Patented Nov. 8, 1932

1,886,449

UNITED STATES PATENT OFFICE

FRITZ SOMMER AND MAX NASSAU, OF CHARLOTTENBURG-BERLIN, GERMANY, ASSIGNORS TO CHEMISCHE FABRIK GRUNAU LANDSHOFF & MEYER AKTIENGESELLSCHAFT, OF GRUNAU, NEAR BERLIN, GERMANY

PROCESS FOR THE PREPARATION OF N-METHYL-P-AMINOPHENOL SULPHATE

No Drawing. Application filed January 23, 1929, Serial No. 334,599, and in Germany February 29, 1928.

It is well known that the products of condensation of amines and aldehydes, for instance the anhydroformaniline can be reduced in alkaline solution by the application of zinc dust. For instance, German Patent 75,854 discloses the preparation of monomethylaniline and monomethyltoluidine by that method. In a similar manner a process for the reduction of mixtures of amines and formaldehyde by means of zinc dust in the presence of an alkali is described in British Patent 102,834 and French Patent 485,282 respectively.

Up to the present it did not appear possible to use that process for aminophenols, since owing to the high sensitiveness of those compounds to alkalies the methods mentioned above give at best but very unsatisfactory yields.

We have now found that we can overcome the difficulties mentioned, if we carry out the reduction of the finished methylene compound or while it is being formed by means of activated aluminum (as described in Berichte Dtsch. Chem. Gesellschaft, vol. 57 (1924) page 671), in an alkaline solution. We have been able to prepare by that method the monomethylparaminophenol with an excellent yield.

Working with sodium hydrate and carrying out the process by keeping the atomic proportion of sodium to aluminum about 1:1, the process can be performed in such a manner that after neutralizing with sulphuric acid a mixed solution of monomethylparaminophenol sulphate and sodium alum is produced. By concentrating the solution pure crystals of monomethylparaminophenol sulphate are obtained, while the sodium alum remains in the mother liquor.

Since the solubility of the monomethylparaminophenol sulphate is reduced to a fraction of its normal solubility owing to the salting out effect of the alum, it is possible to obtain nearly the total quantity of the monomethylparaminophenol formed by that procedure. The expensive shaking or extraction with ether or the employment of other solvents can be dispensed with altogether and there ensues besides the great advantage that the base is recovered in the form of its sulphate which is of high value for technical purposes.

Example

In a vessel provided with an agitator 66 gr. of paraminophenol are dissolved in 1500 gr. of an aqueous solution of 43 gr. of caustic soda. While the stirring is continued 49 gr. of 40% formaldehyde are allowed to run in and then 30 gr. of activated aluminum are gradually added. After the reaction is complete the agitation of the mass is continued for some time. The mass is neutralized with sulphuric acid and then boiled a short time with some carbon. The filtered solution is finally concentrated, and on cooling pure monomethylparaminophenol sulphate crystallizes out.

What we claim is:—

A process for the preparation of N-methyl-p-aminophenol sulphate, in which p-aminophenol is dissolved in an aqueous caustic soda solution, into which formaldehyde solution is allowed to run while stirring all the time and activated aluminum is gradually added at the same time, whereupon after the reaction is complete the mass is filtered and the filtrate neutralized with sulphuric acid, so that after decolorizing and boiling down the solution pure N-methyl-p-aminophenol sulphate is crystallized out on cooling.

In testimony whereof we affix our signatures.

FRITZ SOMMER.
MAX NASSAU.